June 6, 1972 H. NEMETH ET AL 3,667,764

TOY PHONOGRAPH MECHANISM

Filed Oct. 1, 1969 2 Sheets-Sheet 1

INVENTORS
HENRY NEMETH
EDWIN A. NIELSEN
BY HARVEY BERKIN

Amster & Rothstein
ATTORNEYS

June 6, 1972 H. NEMETH ET AL 3,667,764

TOY PHONOGRAPH MECHANISM

Filed Oct. 1, 1969 2 Sheets-Sheet 2

United States Patent Office 3,667,764
Patented June 6, 1972

3,667,764
TOY PHONOGRAPH MECHANISM

Henry Nemeth, Massapequa, Edwin August Nielsen, Oceanside, and Harvey Berkin, Merrick, N.Y., assignors to Ideal Toy Corporation, Hollis, N.Y.

Filed Oct. 1, 1969, Ser. No. 862,694
Int. Cl. G11b *25/04, 25/06*
U.S. Cl. 274—9 R 16 Claims

ABSTRACT OF THE DISCLOSURE

A phonograph for use in dolls, toys, games and the like which includes a record member or disc having plural individual sound grooves on the surface arranged concentrically of each other and a battery-powered, motor-driven, record-playing mechanism arranged to play the messages of the individual sound grooves when the attitude or position of the phonograph is changed, and on a random basis, such that the mechanism appears to function spontaneously and produces any one of the plural messages.

The present invention relates to sound-reproducing devices, and in particular to a relatively small and compact phonograph which is adapted to play a record member or disc having plural sound grooves thereon in response to changes of attitude of the doll, toy or game incorporating such phonograph.

Commencing as early as the work of Thomas A. Edison and throughout this century various phonograph mechanisms have been provided in the prior art and produced commercially for playing sound records or discs which phonograph mechanisms are of a size such that they can be readily incorporated into dolls, stuffed toys, etc. Additionally, it is also notoriously old to provide a record member or disc which has a groove-containing surface and plural individual sound grooves cut on such surface, either on a lateral or hill and dale basis. The plural individual concentric sound grooves may be arranged in a variety of ways including the provision of grooves having individual starting points at spaced locations about the outer periphery of the record member and finishing points about the inner periphery of the record member at spaced locations or in common finishing or run-out track. When placed on an automatic record changer or player, the multiple massages of this type of record are played back on a random basis. One typical application for this type of record has been the so-called "mystery" record wherein different ones of the plural sound tracks which are played back on a random basis reproduce similar sound messages having unexpected and different endings (i.e., a horse race with different winners depending upon which of the record grooves is tracked). The prior art also includes scaled down and simplified versions of conventional phonograph mechanisms which also have been employed in a wide variety of toys, including dolls, to impart audible animation to such toys.

In the application to the toy industry of these well known record-playing mechanims, record types and principles of playback, there exists an ever present need for simplification of the record-playing mechanisms with a view to achieving cost reduction and greater reliability under conditions of prolonged and often abusive use and increased functionality in speech simulation. Thus, it has been suggested that if a phonograph mechanism could be devised to spontaneously playback one of a plurality of messages on a somewhat random basis (i.e. in response to any one of a number of movements of the doll or toy incorporating the mechanism) that this would lend itself to providing dolls and toys having an enhanced play value and more life-like characteristics. For example, a doll upon being picked up by the child and manipulated during the normal play with the doll would suddenly utter one of a multiplicity of sentences or sounds; and depending upon the attitude of the doll at the end of any particular phonograph play, the doll might go on to speak a still further sentence or utter a further sound.

Broadly, it is an object of the present invention to provide a phonograph capable of reproducing one of a plurality of messages on an apparently spontaneous basis, that is in response to changes in position, attitude or orientation of the phonograph. Further objects of the invention reside in the provision of a phonograph of this type which is a relatively simple construction, capable of manufacture on a mass basis or relatively low unit cost and highly reliable in operations such that it may be utilized over prolonged periods without the need for servicing, repair or replacement of parts.

In accordance with an illustrative embodiment demonstrating objects and features of the present invention, there is provided a phonograph which comprises a support on which a turntable is mounted, which turntable includes a record member having a groove-containing surface and a central well depressed relative to the surface. The record member has a plurality of individual, concentric sound grooves on the groove-containing surface thereof. Provision is made for mounting the turntable on the support for rotation about a turntable axis and for axial displacement along the turntable axis. A tone arm overlies the record member and has a stylus which is adapted to track the sound grooves on a substantially random basis, with the tone arm being mounted for pivotal movement in a plane substantially parallel to the turntable from a starting position to a finishing position. A first spring normally biases the tone arm to a starting position. A speaker is spaced from the turntable and disposed in operative relation to the tone arm while the stylus is tracking one of the grooves between its starting and finishing positions and while the turntable is in a running position. A second spring normally biases the turntable out of the running position and toward the speaker or diaphram into a reset position. The turntable moves into the reset position under the influence of the second spring when the stylus completes the tracking of one of the grooves and drops into the well at a predetermined rest location. A motor drive is operatively connected to the turntable for rotating the same through a record-playing interval and reset means are provided which are operable in response to the initiation of a record-playing interval to restore the turntable to the running position against the influence of the second spring whereupon the tone arm is restored to the starting position under the influence of the first spring.

As as feature of the invention, the sound record which is played back in the phonograph includes a circular record member wherein the groove-containing surface has at least one sound groove extending from the outer periphery to an intermediate circumferential location spaced from the center thereof. The record member is provided with a central well and a ledge disposed intermediate the well and the groove-containing surface which ledge receives the stylus after it tracks one of the grooves. Cam means are provided on the ledge for guiding the stylus to drop into the well at a predetermined circumferential location after the stylus has tracked the sound groove such that the record is oriented substantially in the same rotational attitude to the phonograph mechanisms after successive plays.

The above brief description, as well as further objects, features and advantages of the present invention will be more fully appreciated by reference to the following detailed description of a presently preferred but nonetheless illustrative embodiment of the invention, when taken in conjunction with the accompanying drawings, wherein.

Figure 1:
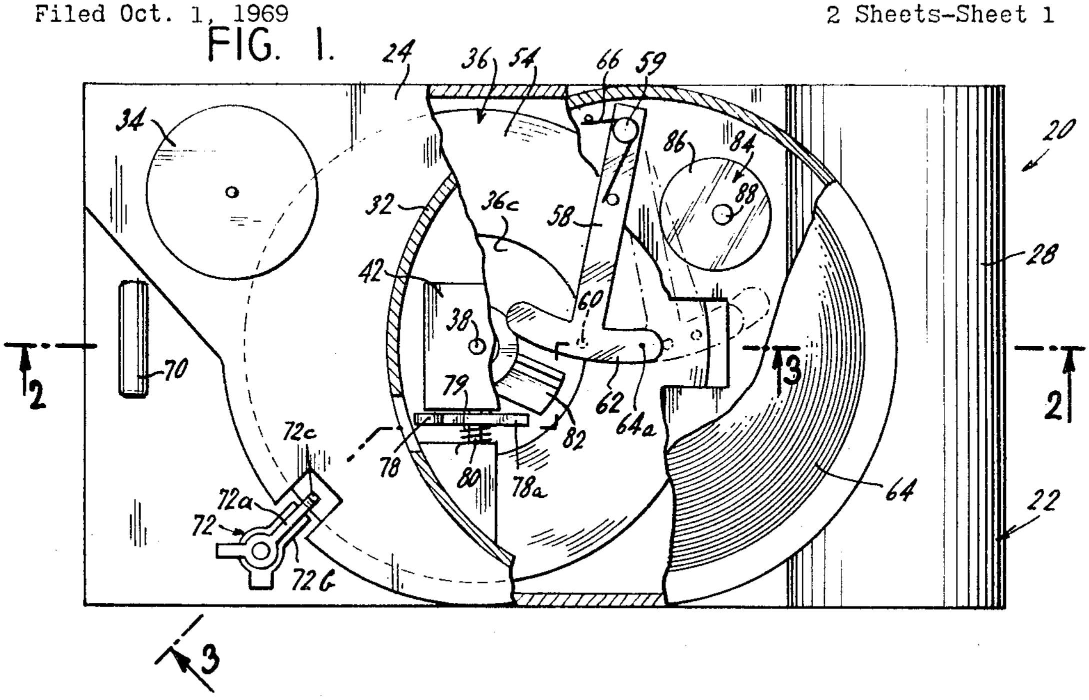
FIG. 1 is a plan view with parts broken away and shown in section of a phonograph embodying features and advantages of the present invention.

Referring now specifically to the drawings, the phonograph of the present invention, generally designated by the reference numeral 20, includes a support or casing 22 which includes a substantially rectangular turntable housing 24 having a removable bottom 26 and a transversely-extending semi-circular battery case 28 also having a removable bottom 30. Projecting upwardly from the main body of casing 22 is an upstanding cylindrical speaker housing 32 which may be a separate molding from casing 22 and is attached thereto in any convenient fashion. Also projecting upwardly from casing 22 is a motor housing 34 which likewise may be a separate molding.

Disposed within the turntable housing 24 is a turntable 36 which is journaled on a turntable shaft 38 mounted in a bearing 40 on bottom wall 26 and held in position, as by an inverted U-shaped holddown bracket 42. Surrounding the turntable shaft 38 and its bearing 40 is a turntable bias spring 44 which bears against turntable 36 and normally biases the turntable away from bottom wall 26. The turntable 36 is axially displaceable along turntable shaft 38 and the turntable axis defined thereby such that the turntable may assume any one of a number of axial positions and rotate in any such axial position. The several axial positions include the inoperative position shown in FIGS. 2 and 3, the clearance or reset position shown in FIG. 4 and the running position shown in FIG. 5.

Figure 7:
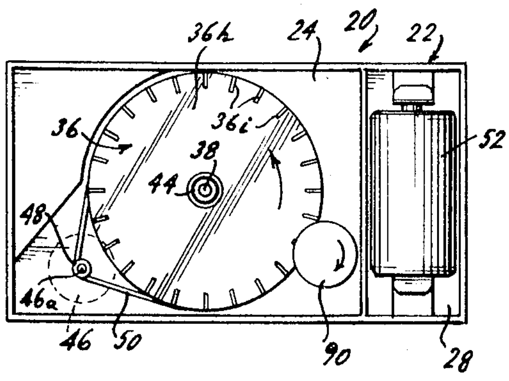
FIG. 7 is a bottom plan view on a reduced scale and with the bottom cover or covers of the phonograph removed.

Drive is imparted to the turntable 36 for the requisite record-playing cycle or interval from a fractional horse power motor 46 which is mounted within motor housing 34 with its motor shaft **46*a* projecting into the turntable housing (see FIG. 7). Motor shaft 46*a* carries a drive pulley 48 which is coupled by belt 50 to the turntable 36, with the belt being received within a circumferentially extending belt groove in the periphery of turntable 36. Motor 46 is energized from a battery 52, which may be the usual D cell, received within battery housing 28** and connected to a motor-control circuit to be described in conjunction with FIG. 10.

Turntable 36 includes a record member or sound disc 54 which is secured to the turntable 36 in any appropriate fashion and for all intents and purposes may be considered to be integral with turntable 36. Record member or disc 54 includes an annular groove-containing surface **54*a* which extends from the outer periphery 54*b* to an intermediate circumferential location 54*c* spaced from the center of the record (see FIGS. 8 and 9). The groove-containing surface 54*a* has a plurality of individual sound grooves arranged concentrically of each other, one such groove being designated by the reference numeral 56. Each of the sound grooves 56 has a starting point contiguous to the outer periphery of the record and along a common radius (i.e. starting point 56*a*) and a finishing point at the intermediate circumferential location 54*c* (i.e. finishing point 56*b*). The circumferentially-spaced finishing points for the spiraling sound grooves 56 terminate at an upstanding cylindrical wall 36*a* of turntable 36, cylindrical wall 36*a* projects upwardly from and defines the outer periphery of an annular ledge 36*b* which extends about the turntable and is bounded at its outer periphery by the intermediate circumferential location. At its inner circumference, annular ledge 36*b* merges with a central well 36*c* formed in the turntable 36 and bounded by wall 36*d*. Integrally with the ledge 36*b* is a lead-in cam 36*e* which has its leading end 36*f* (in the direction of rotation of the record 54) merging into upstanding cylindrical wall 36*a* and has its trailing end 36*g* (in the direction of rotation of the record) merging into the upstanding wall 36*d* bounding well 36*c*. Accordingly, and as will subsequently become apparent when the record-tracing stylus emerges from the finishing point or end of any one of the sound grooves 56*h* and overiles ledge 36*b*, rotation of the record 54 will cause the stylus to engage the lead-in cam 36*e* and the stylus will be dropped into well 36*c* at a predetermined rotational position of record 54**.

Overlying the record member 54 is a tone arm 58 which is mounted at its outer end on the casing 22 at a tone arm shaft 59 for tracking motion in a plane substantially parallel to the record 54 and its turntable 36. Tone arm 58 carries a stylus 60 at its inner, free end and is formed with a radially-extending, speaker-contact member 62. In this illustrative embodiment, member 62 is integral wth tone arm 58 and projects from the opposite sides thereof contiguous to the free end of the tone arm. Overlying the tone arm 58 is a speaker 64 which is mounted in an appropriate fashion in housing 32. Speaker-contact member 62 is arranged to contact the speaker or diaphragm 64 at its apex **64*a* when the phonograph is in the running position (see FIG. 5). A tone arm bias spring 66 is anchored on the support 22 and operatively connected to the tone arm 58 to normally bias the tone arm into one of plurality of starting positions contiguous to the outer periphery of the record 54, the plural starting positions being shown on an exaggerated scale by the dot dash lines in FIG. 8. Speaker-contact member 62 is of a radial extent such that the motion imparted to the tone arm 58 from stylus 60 as a particular record groove 56 is tracked, is in turn transmitted to the speaker 64**, from start to finish of such groove.

Figure 4:
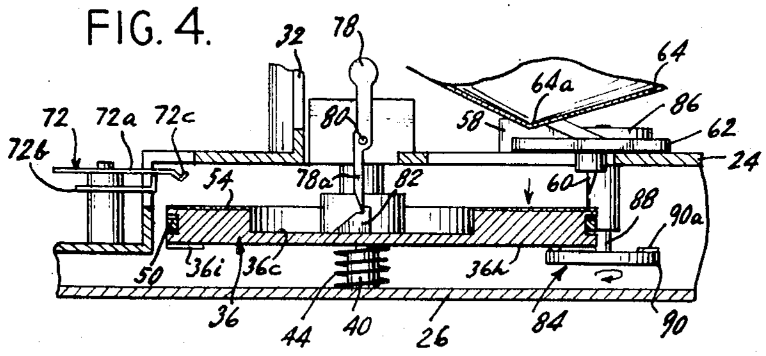
FIG. 4 is a view similar to FIG. 3 but showing the turntable and record in a clearance position, with the stylus in the starting position relative to the record.
Figure 5:
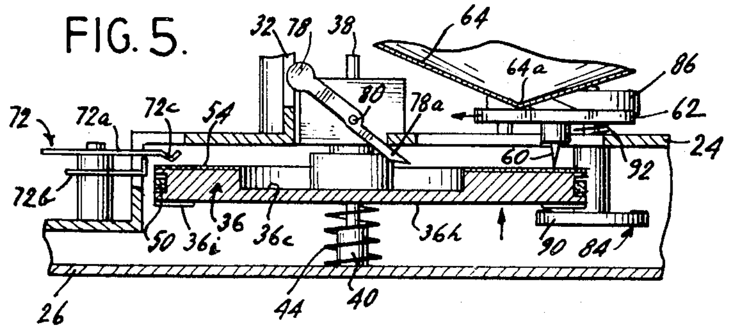
FIG. 5 is a view similar to FIG. 4 but showing the record-playing cycle advanced to the point where the turntable is in its running position and the stylus is tracking one of the grooves of the record.

Based upon the foregoing, and by way of review, it wil be appreciated that when turntable 36 and record 54 are depressed against the bias of spring 44 with stylus 60 in well **36*c* and the record 54 and turntable 36 are moved to a clearance position, (for example as shown in FIG. 4) tone arm 58 will return to its starting position contiguous to the outer periphery of the record 54 and be positioned to track one of the sound grooves 56. Upon release of the turntable and record, spring 44 will bias the record against the stylus and the stylus will be effectively trapped in a motion-transmitting system from record 54 through stylus 60, tone arm 58** and speaker-contact member 62 to speaker 64. If required, the pivot for tone arm 58 may be arranged such that the tone arm may float upward and downward, to a limited degree, to aid in resetting thereof. As the record-playing cycle proceeds, stylus 60 tracks one of the grooves 56, emerges from the exit or finishing end of such groove, drops into ledge 36*b* and is then led into well 36*c* by cam 36*e*. There will now be described the electrical and control circuit for battery-operated motor 46, the phonograph mechanisms for initiating and terminating the record-playing cycle, and the mechanism for randomly positioning the stylus in starting positions relative to the several sound grooves 56.

Figure 2:
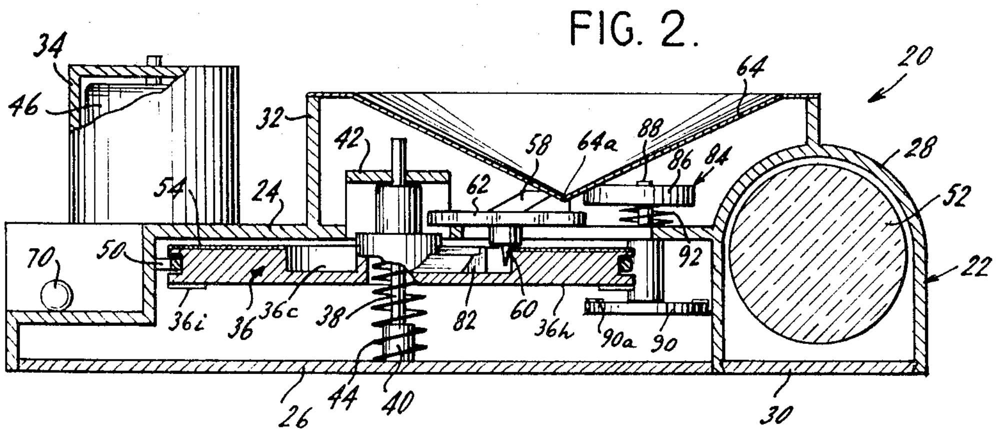
FIG. 2 is a sectional view taken substantially along the line 2—2 of FIG. 1 and looking in the direction of the arrows.
Figure 3:
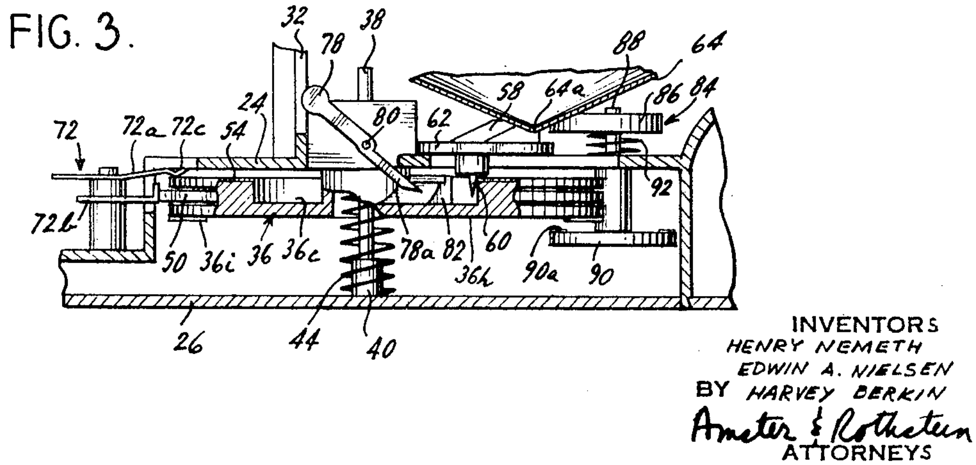
FIG. 3 is a fragmentary sectional view taken substantially along the line 3—3 of FIG. 1 and showing the record and related mechanisms at the completion of a record-playing interval.
Figure 10:
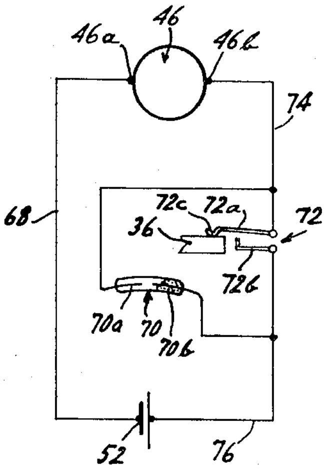
FIG. 10 is a simplified electrical diagram for the phonograph.

As seen in FIG. 10, motor 46 includes the usual motor terminals 46*a*, 46*b*, one terminal 46*a* being connected via lead 68 to one side of the battery 52 and the other motor terminal 46*b* being connected to the other side of battery 52 over two parallel switch circuits. One switch circuit momentarily completes the energization circuit for the motor to initiate the turntable rotation and a record-playing cycle and the other switch circuit continues the record-playing cycle for so long as stylus 60 is tracking one the grooves and the turntable is in the running position illustrated in FIG. 5. The initiating switch circuit includes switch 70 which is responsive to the attitude, position or orientation of the phonograph 20 and may take a variety of forms including a mercury switch wherein a mercury pool bridges switch contacts 70*a*, 70*b* or a mechanical switch wherein an electrically conductive ball confined in a housing bridges contacts comparable to contact 70*a*, 70*b* in response to changes in attitude, etc. A typical position for mercury switch 70 is shown in FIGS. 1 and 2 and is illustrated without any wiring attached thereto in the interests of simplicity. Paralleling initiating switch 70 is the further switch 72, the opening and closing of which is controlled by the position of turntable 36. Switch 72 has contacts 72*a*, 72*b*. Contacts 70*a*, 72*a* are connected by a common lead 74 to motor terminal 46*b* while contacts 70*b*, 72*b* are connected by a common lead 76 to battery 52. Switch 72 is seen in FIGS. 1 and 3 to 5 inclusive, once again with the requisite wiring illustrated in FIG. 10 being eliminated for simplicity in illustration. Contacts 72*a* and 72*b* of switch 72 are of the spring type and are arranged to normally be closed. Contact 72*a* is provided with an extension 72*c* serving at a switch actuator which overlies turntable 36. Switch 72 is positioned such that when the turntable is in the reset or clearance position of FIG. 4 or in the running position of FIG. 5, contacts 72*a*, 72*b* are closed to complete a motor-energization circuit paralleling attitude-responsive switch 70. However, when the stylus 60 falls into well 36*c* (as seen in FIG. 3) turntable 36 contacts switch extension or actuator 72*c* to open the switch 72. Accordingly, when the stylus 60 drops into the well 36*c*, the record-playing cycle will be terminated. Depending upon the condition of attitude-responsive switch 70, the phonograph may or may not be automatically activated for the next record-playing interval. Upon closing of attitude-responsive switch 70 with the phonograph in the inoperative position illustrated in FIG. 3, the energization circuit for motor 46 is completed and turntable 36 will begin to rotate over this potentially short duration energization circuit but for a sufficient interval to be moved away axially from switch actuator 72*c* and toward the clearance position illustrated in FIG. 4 such that turntable-position switch 72 will take over and continue the energization circuit.

Axial displacement of the turntable 36 and record 54 into the clearance position of FIG. 4 in response to the initial rotation of the turntable at the beginning of a record-playing cycle is achieved by coacting reset means which are mounted on the turntable 36 and on the casing or support 22 at the predetermined reset location determined by the trailing end of cam or ramping member 36*g*. The coacting reset means includes a pivoted reset member 78 having arm 78*a* which is mounted on the casing at pivot 80, for example, on the side of the bracket 42 and is biased by spring 79 (see FIG. 1) to engage a ramp or cam 82 within the well 36*c* of the turntable 36 which is mounted at the appropriate radial position to engage the pivoted reset member 78. Due to the arrangement for rotationally orienting the turntable 36 and record 54 at the end of each record-playing cycle, pivoted reset member 78 will contact ramp or cam member 82 as soon as drive is imparted to the turntable 36 to immediately depress turntable against the bias of spring 44, as may be appreciated by progressively inspecting FIGS. 3 and 4, and as indicated by the directional arrow overlying the record in FIG. 4. As soon as turntable 36 is depressed to the point where record 54 clears the tip of stylus 60, tone arm 58 is restored to its starting position by spring 66. Of course, turntable-responsive switch 72 closes to assure continued operation for the record-playing cycle.

Figure 6:
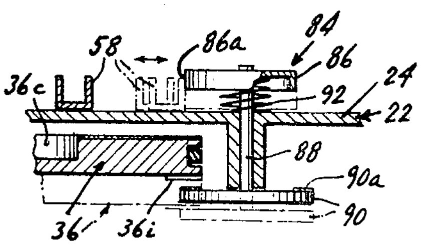
FIG. 6 is a fragmentary sectional view showing the positioning mechanisms for the tone arm which are responsive to rotation of the turntable while in its clearance position for establishing various starting poistions for the stylus relative to the record.
Figure 8:
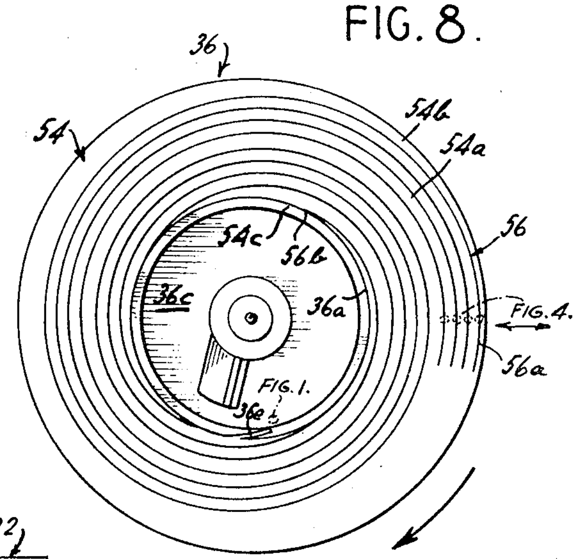
FIG. 8 is a plan view which is enlarged and simplified showing a typical sound record member having plural sound grooves arranged concentrically of each other and having respective starting points along a common radius of the record.
Figure 9:
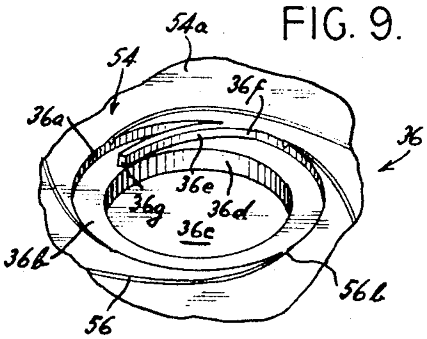
FIG. 9 is a fragmentary perspective view of the central portion of the present record and showing the terminal points of the multiple sound grooves, the central well and the intermediate ledge and cam incorporated.

Tone arm-positioning means 84 are provided which are responsive to rotation of the turntable 36 in the clearance position of FIG. 4 for establishing various starting positions for the stylus 60 in relation to the several grooves, as illustrated diagrammatically in FIG. 8. The tone arm-positioning means 84 includes an eccentric 86 having a peripheral abutment surface 86*a* which is positioned to contact tone arm 58 and to establish various radial positions of the tone arm at the outer periphery of record 54. Eccentric 86 is journaled for rotation on the casing or support 22 by eccentric shaft 88 which is parallel to turntable shaft 38 and extends to a location below the turntable 36 where it carries a turntable follower 90. Turntable follower 90 is at a level in relation to the turntable 36 such that in the running position (see FIG. 5), it is clear of the underside 36*h* of turntable 36. The tone arm-positioning means 84 includes a spring 92 which normally biases the positioning assembly 86, 88, 90 to the full line position illustrated in FIGS. 3, 5 and 6. When turntable 36 moves into the clearance position illustrated in FIG. 4, a frictional driving contact is established between the underside 36*h* of turntable and follower 90 (see the full line showing in FIG. 4 and the dotted showing in FIG. 6) and for a short interval at the beginning of the record-playing cycle (while reset member 78 engages ramp 82) rotation is imparted to eccentric 86 such that various portions of its peripheral abutment surface 86*a* are disposed in blocking relation to tone arm 58 to establish various starting positions of the plural sound grooves 56. It will be appreciated that the spring 92 assists in establishing a releasable driving connection between turntable 36 and follower 90 in that it is stressed in response to movement of the turntable 36 into the clearance position illustrated in FIG. 4. This driving connection may be enhanced by the provision of interengaging means onto the turntable 36 and the follower 90 which coact with each other when the releasable driving connection is established. For example, the underside of the turntable may be provided with peripherally spaced radially extending projections 36*i* (see FIG. 7) which are engagable with one or more corresponding projections 90*a* on an upper face of follower 90 (see FIG. 6), when turntable 36 moves to the running position (FIG. 5), eccentric 86 will coact to a stop.

A typical sequence of operations will now be described to facilitate a more thorough understanding of the present invention:

At the completion of any record-playing interval the phonograph 20 is in the inoperative position illustrated in FIGS. 1 to 2 inclusive, as recognized by the stylus 60 being disposed in turntable well 36*c*. Reset member 78 is in position to engage ramp member 82 due to the precise rotational orientation of record 54 and turntable 36 at the end of the previous record-playing cycle, with reset member being biased by spring 79 to interfere with ramp member 82 in response to the initial rotation of turntable 36 in the clockwise direction viewed in FIG. 1. When the attitude of the phonograph is changed to momentarily close switch 70, an energization circuit for motor 46 is completed over line 68 to one side of battery 52 and over line 74, switch 70 and line 76 to the other side of the battery (see FIG. 10). As the turntable begins to rotate in the clockwise direction, ramp member 82 contacts reset member 78 and turns its depending arm of finger 78$a$ in the clockwise direction about pivot 80 which proceeds to depress turntable 36 against the bias spring 44 to move the same out of the inoperative position of FIG. 3 to the clearance position illustrated in FIG. 4. As turntable 36 moves toward the clearance position, switch 72 closes to take over the energization circuit for motor and assure continued motor operation for the record-playing interval. Concurrently, tone arm 58 is reset under the influence of its spring and the tome arm-positioning mechanism 84 is operable to impart rotation to eccentric 86. The amount of rotation imparted to the eccentric is a variable function which is not precisely repeatable in any one record-playing interval. Accordingly, the particular radius of the abutment presented to the tone arm will be variable, from cycle to cycle, and the corresponding set down positions of the stylus will likewise be variable and produce random playback of the record 56. When ramp member 82 passes beneath the finger 78$a$ of the reset member 78, the stylus, in whatever starting position it is as a function of the rotational position of the eccentric 86 will begin to track one of the sound grooves. The record-playing interval proceeds until such time as stylus emerges from the finishing end of the particular sound groove and is dropped into the well of the record whereupon spring 44 biases the turntable to the position illustrated in FIG. 3 wherein switch 72 opens to disrupt the energization circuit provided that attitude-responsive switch 70, at that particular time, is not providing a complete energization circuit over its parallel leg.

In a typical construction, the record may be approximately three inches in diameter, the intermediate circumferential location is at a one and a half inch diameter and eight record grooves provided each of twenty-four second duration at a speed of 120 r.p.m. Typically, the annular ledge of plateau 36$b$ may be approximately a sixteenth of an inch in width and the drop into the well may be of the order of two tenths of an inch.

From the foregoing, it will be appreciated that there has been provided in accordance with the invention a mechanically simple and reliable phonograph mechanism which is attitude responsive and will play one or more of a plurality of messages on a random basis with the phonograph having a somewhat spontaneous action depending upon its attitude at the end of any record-playing interval or at any time thereafter. A latitude of modification change and substitution is intended in the foregoing disclosure and in certain instances some features of the invention will be used without a corresponding use of other features. Accordingly, it is appropriate that the appended claims be construed broadly and in a manner consistent with the spirit and scope of the invention.

What we claim is:

1. A phonograph comprising a support, a turntable including a record member having a groove-containing surface and a central well depressed relative to said surface, plural individual sound grooves on said surface arranged concentrically of each other, said sound grooves each starting along a substantially common radius contiguous to the outer periphery of said record member and each finishing at spaced circumferential locations about the inner periphery of said record member contiguous to said well, means including a turntable shaft operatively connected to and mounting said turntable for rotation about a turntable axis and for axial displacement along said turntable axis, a tone arm overlying said record member and having a stylus adapted to track said sound grooves on a substantially random basis, means mounting said tone arm for pivotal movement in a plane substantially parallel to said turntable from starting positions wherein said stylus is contiguous to said outer periphery along said radius to a finishing position contiguous to said inner periphery, a first spring normally biasing said tone arm to said starting position, a diaphragm spaced from said turntable and in operative relation to said tone arm while said stylus is tracking one of said grooves between its starting and finishing positions and said turntable is in a running position, a second spring normally biasing said turntable out of said running position and toward said diaphragm into a reset position, said turntable moving into said reset position under the influence of said second spring when said stylus completes the tracking of one of said grooves and drops into said well at a predetermined reset location, a drive operatively connected to said turntable for rotating the same for a record-playing interval, coacting reset means on said turntable and said support at said reset location and operable in response to the initiation of a record-playing interval to axially displace said turntable to establish a clearance position against the influence of said second spring wherein said drive rotates said turntable while in said clearance position whereupon said tone arm is restored to said starting position under the influence of said first spring, means responsive to the completion of a record-playing interval and the dropping of said stylus into said well for terminating drive to said turntable and tone arm-positioning means responsive to rotation of said turntable in said clearance position for establishing various starting positions for said stylus relative to said plural sound grooves.

2. A photograph according to claim 1 wherein said tone arm-positioning means includes an eccentric having a peripheral abutment surface, an eccentric shaft journaled on said support in spaced parallel relation to said turntable shaft and positioned to present successive portions of said peripheral abutment surface in blocking relation to said tone arm to establish various starting positions for said stylus along said common radius and in relation to the starts of said plural sound grooves.

3. A phonograph according to claim 2 including a follower on said eccentric shaft and disposed in spaced relation to said turntable when the latter is in said running position, said follower being engaged by said turntable when the latter is in said clearance position and being turned in response to rotation of said turntable to randomly position said abutment surface of said eccentric.

4. A phonograph according to claim 3 including means on said support mounting the assembly of said eccentric, said eccentric shaft and said follower for axial displacement and a third spring being stressed in response to movement of said turntable into said clearance position to establish a releasable driving connection between said turntable and said follower.

5. A phonograph according to claim 4 including interengaging means on said turntable and said follower and coacting with each other when said releasable driving connection is established.

6. A phonograph according to claim 5 wherein said interengaging means includes circumferentially spaced radial projections on both said turntable and said follower.

7. A phonograph according to claim 1 wherein said record member includes means for guiding said stylus to fall into said well in a predetermined position for establishing substantially the same rotational orientation for said record member at the completion of each record-playing interval.

8. A phonograph according to claim 7 wherein said coacting reset means on said turntable and support are positioned relative to each other for initiating a further record-playing interval in response to the rotation of said record member.

9. A phonograph according to claim 7 wherein said record member includes a ledge surrounding said well intermediate said well and the finish of said sound grooves and cam means on said ledge engageable with said stylus after it leaves various ones of said sound grooves for pushing said stylus into said well and arranged to establish said rotational orientation.

10. A phonograph comprising a support, a turntable including a record member having a groove-containing surface and a central well depressed relative to said surface, a plurality of individual sound grooves on said surface arranged concentrically of each other, means operatively connected to and mounting said turntable for rotation about a turntable axis and for axial displacement along said turntable axis, a tone arm overlying said record member and having a stylus adapted to track said sound grooves on a substantially random basis, means mounting said tone arm on said support for pivotal movement in a plane substantially parallel to said turntable from a starting position to a finishing position, a first spring normally biasing said tone arm to said starting poistion, a diaphragm spaced from said turntable and in operative relation to said tone arm while said stylus is tracking one of said grooves between its starting and finishing positions and said turntable is in a running position, a second spring normally biasing said turntable out of said running position and toward said diaphragm into a reset position, a drive operatively connected to said turntable for rotating the same for a record-playing interval, reset means operable in response to the initiation of a record-playing interval to axially displace said turntable to establish a clearance position against the influence of said second spring wherein said drive rotates said turntable while in said clearance position whereupon said tone arm is restored to said starting position under the influence of said first spring and tone arm-positioning means responsive to rotation of said turntable in said clearance position for establishing predetermined starting positions for said stylus relative to said plural sound grooves.

11. A phonograph according to claim 10 wherein said record member includes means for guiding said stylus to fall into said well in a predetermined position for establising substantially the same rotational orientation for said record member at the completion of each record playing interval.

12. A phonograph according to claim 11 wherein said coacting reset means on said turntable and support are positioned relative to each other for initiating a further record-playing interval in response to the rotation of said record member.

13. A phonograph according to claim 11 wherein said record member includes a ledge surrounding said well intermediate said well and the finish of said sound grooves and cam means on said ledge engageable with said stylus after it leaves various ones of said sound grooves for pushing said stylus into said well and arranged to establish said rotational orientation.

14. A sound record adapted to be to be tracked by a stylus comprising a circular record member having a groove-containing surface having at least one sound groove extending from the outer periphery to an intermediate circumferential location spaced from the center thereof, a central well in said record member, a ledge intermediate said well and said groove-containing surface and cam means on said ledge for guiding a stylus to drop into said well at a predetermined circumferential location after the stylus has tracked said sound groove.

15. A sound record according to claim 14 including plural individual spiralling sound grooves on said groove-containing surface, each of said sound grooves having a starting point contiguous to said outer periphery and a finishing point at said intermediate circumferential location and along the outer edge of said ledge.

16. A sound record according to claim 15 wherein said starting points for said plural sound grooves are arranged along a common radius of said record member.

References Cited

UNITED STATES PATENTS

| | | | |
|---|---|---|---|
| 3,211,460 | 10/1965 | Lea | 274—1 A |
| 3,532,346 | 10/1970 | Barcus et al. | 274—1 A |
| 3,401,942 | 9/1968 | Strauss | 274—9 X |
| 3,479,037 | 11/1969 | Tomlyama | 274—9 |

HARRY N. HAROIAN, Primary Examiner